No. 897,598. PATENTED SEPT. 1, 1908.
P. DAIMLER.
LUBRICATOR.
APPLICATION FILED SEPT. 4, 1907.
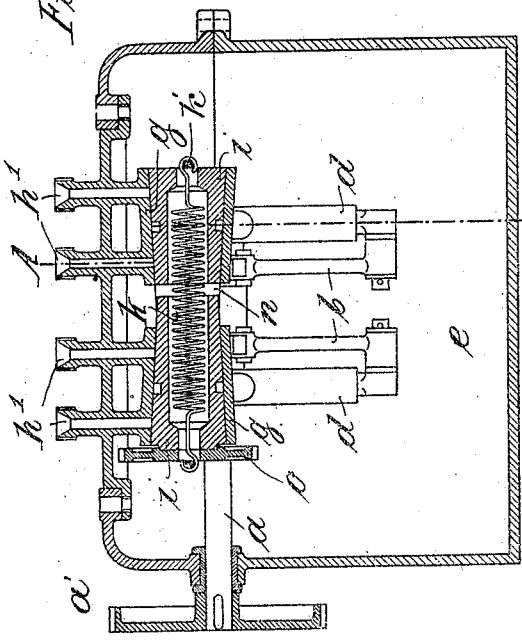
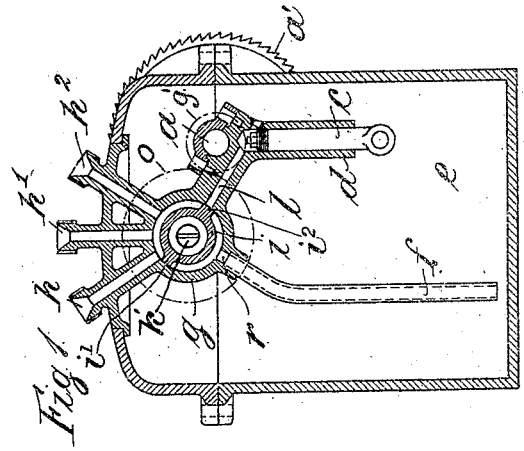
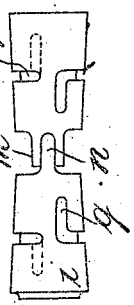
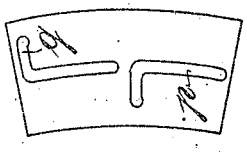
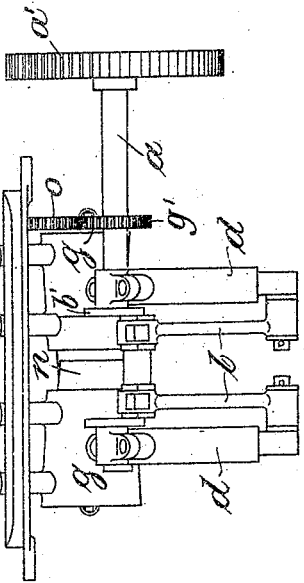
Witnesses:
Paul Wollenberg.
Emil Kayser.
Inventor:
Paul Daimler.
by Prosser Ripley
Attorney

UNITED STATES PATENT OFFICE.

PAUL DAIMLER, OF UNTERTÜRKHEIM, GERMANY, ASSIGNOR TO THE FIRM OF DAIMLER MOTORENGESELLSCHAFT, OF UNTERTÜRKHEIM, GERMANY.

LUBRICATOR.

No. 897,598.     Specification of Letters Patent.     Patented Sept. 1, 1908.

Application filed September 4, 1907. Serial No. 391,316.

*To all whom it may concern:*

Be it known that I, PAUL DAIMLER, a subject of the King of Würtemberg, and resident of Unterturkheim, Kingdom of Würtemberg, Germany, have invented a new and useful Lubricator, of which the following is an exact specification.

This invention relates to lubricators in which a pump or pumps are employed to deliver oil to a number of places on an engine or machine.

The improved lubricator is illustrated in the accompanying drawings in which

Figure 1 is a cross section, Fig. 2 is a longitudinal section through the lubricator, Fig. 3 is an outside view of the lubricator, Fig. 4 is an outside view of the valve which I employ, Fig. 5 is a development of the part of the valve showing the shape of the grooves therein.

In carrying the invention into effect according to the form shown a driving shaft $a$ has fixed to it at one end a ratchet wheel $a'$ by which it may be driven in any convenient way not shown. The shaft $a$ is supported in a casing $e$ in the bottom part of which the oil for circulation is placed. The pumps are in the form shown cast in one with the cover of the casing $e$ and there is cast together with a cover a cylindrical body $g$ from which tubes $h$, $h'$, $h^2$ lead. The passage $l$ leads from the cylindrical valve casing $g$ to the pump cylinder $d$. Within the pump cylinder $d$ there works a piston $c$ connected by rods $b$ Fig. 2.
to crank disks $b'$ on the shaft $a$. On a shaft $a$ there is also mounted a gear wheel $g'$ gearing with a larger gear wheel $o$ which is fixed to the rotating valve $i$ which is common to all the pumps and which is shown separately in detail in Fig. 4.

As seen in Figs. 2 and 4 the valve $i$ consists of two conical parts oppositely arranged with their narrow ends towards one another and pressed against the conical surfaces of the valve casings $g$ by means of a spring $k$ gripping in cross pieces $k'$ at the end of both the parts $i$.

As seen in Fig. 4 the left hand part $i$ is provided with a lug $n$ engaging in a recess formed on a projection $m$ on the right hand part $i$. In this way both the parts rotate together when one of them is moved by means of the wheel $o$. To the cylindrical casing $g$ there are also connected pipes $f$ one for each of the pumps $d$. The pipes $f$ have been omitted in Fig. 3 but this arrangement will be understood from Fig. 1. These pipes lead from the port $r$ in the casing to the lower end of the oil containing space $e$. The valve parts $i$ are provided with L-shaped grooves $q$ $p$. The circumferentially arranged parts $p$ being in the same plane and arranged opposite the passage $l$ to the pump $d$ and the port $r$. The axially arranged parts $q$ extend on opposite sides of the circumferentially arranged grooves $p$.

The operation of the device is as follows: For each revolution of the valve $i$ the shaft $a$ makes two revolutions. The pump $d$ during its suction stroke is continually in communication with a part $p$ of the groove which part is so arranged that it establishes a communication between the port $r$ and the passage $l$ During the suction stroke of the pump the valve $i$ makes quarter of a revolution so as to close off the port $r$ by means of the stop $i'$. At the same time the stop $i^2$ comes opposite the opening leading to the pipe outlets $h^2$, $h'$ and $h$, so that oil is forced in turn through these openings. It will be seen that during the motion of the groove part $q$ over the outlets $h^2$, $h'$ and $h$ there are intervals when the groove $q$ will be entirely closed. During these intervals the pressure of the oil in the pump causes the valve part $i$ to be pressed outwards and some of the oil finds its way between the valve $i$ and the casing $g$.

As seen from Fig. 2 there are two sets of pipes $h$, $h'$, $h^2$, with which the oppositely axially arranged grooves $q$ in turn coöperate in the manner above described, so that each of the pumps $d$ may be arranged to supply oil to 6 points on the engine or machine and a very simple compact arrangement is obtained in which there is no liability for the rotating valve to become jammed.

Having thus fully described the nature of my invention, what I desire to secure by Letters Patent of the United States is:—

1. A lubricator comprising a plurality of pumps, a common rotating distributing valve and ported casing for said pumps, said valve having spring connected valve parts, substantially as described.

2. A lubricator comprising a plurality of pumps, a common rotating distributing valve and ported casing for said pumps, said valve comprising two oppositely arranged conical parts with their narrow ends towards each other, a slidable coupling between said parts, a spring resiliently binding said parts in an axial direction, substantially as described.

3. A lubricator comprising in combination with a pump, a valve casing having an inlet and a plurality of outlets therein, a rotating valve in said casing having L-shaped grooves therein the circumferentially arranged parts of which coincide continually during the working strokes of the pump with the pump inlet and the axially arranged parts of which during the delivery stroke of the pump come successively and at intervals into communication with outlets circumferentially disposed about said valve.

4. A lubricator comprising, a plurality of pumps and a driving shaft therefor, a valve casing having an oil suction passage for each pump and two groups of outlet passages disposed on the opposite side of said casing from said suction passages, a rotating valve having two L-shaped grooves therein opposite each pump the circumferential parts of said grooves rotating in the plane of the pump passage, while the axial parts extend in opposite directions to connect successively with the outlet passages, gearing from the pump driving shaft to the valve, said gearing being arranged to rotate the valve once for each two revolutions of the pump driving shaft.

5. A lubricator having in combination a plurality of pumps and a driving shaft therefor, a valve casing having oil suction and pump passages arranged in one plane in said casing, two groups of outlet passages in said casing, said groups being arranged in planes on opposite sides of the plane containing the pump passage, a rotating distributing valve in said casing common to all the pumps and comprising spring connected conical parts, each part being opposite a pump and provided with two L-shaped grooves the circumferential parts of which grooves rotate in the plane of the pump passage, while the axial parts extend at diametrically opposite points of the valve, one to each of the groups of outlet passages, a driving gear from the pump shaft to the valve, said driving gear being arranged to rotate the valve once for each two revolutions of the pump driving shaft.

In witness whereof I have hereunto set my hand in the presence of two witnesses.

PAUL DAIMLER.

Witnesses:
ROBERT UHLAND,
ERNEST EISEMAN.